US011104203B2

(12) United States Patent
Blatchley et al.

(10) Patent No.: US 11,104,203 B2
(45) Date of Patent: Aug. 31, 2021

(54) OPPORTUNISTIC SYSTEM AND METHOD FOR DE-ICING AN EXTERIOR HEAT EXCHANGER

(71) Applicant: Ford Global Technologies, LLC, Dearborn, MI (US)

(72) Inventors: Timothy Noah Blatchley, Dearborn, MI (US); Angel Fernando Porras, Dearborn, MI (US); Rohan Shrivastava, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 16/546,238

(22) Filed: Aug. 20, 2019

(65) Prior Publication Data

US 2021/0053420 A1 Feb. 25, 2021

(51) Int. Cl.
*B60H 1/00* (2006.01)

(52) U.S. Cl.
CPC ..... *B60H 1/00785* (2013.01); *B60H 1/00914* (2013.01); *B60H 2001/00928* (2013.01); *B60H 2001/00949* (2013.01)

(58) Field of Classification Search
CPC ............ B60H 1/00785; B60H 1/00914; B60H 2001/00928; B60H 2001/00949
See application file for complete search history.

(56) References Cited

U.S. PATENT DOCUMENTS

| | | | |
|---|---|---|---|
| 5,586,448 A * | 12/1996 | Ikeda | B60H 1/321 62/156 |
| 2011/0067427 A1* | 3/2011 | Haller | B60H 1/00885 62/324.6 |
| 2016/0332504 A1 | 11/2016 | Blatchley et al. | |
| 2018/0202697 A1* | 7/2018 | Huenemoerder | B60H 1/00899 |
| 2020/0284497 A1* | 9/2020 | Blatchley | F25B 30/02 |

* cited by examiner

*Primary Examiner* — Marc E Norman
(74) *Attorney, Agent, or Firm* — David Kelley; McCoy Russell LLP

(57) ABSTRACT

Methods and systems for providing de-icing a heat pump exchanger and heating a vehicle cabin are presented. In one example, a climate control system that experiences icing of the exterior heat exchanger may be operated in a first mode where thermal energy from the energy storage device is used to de-ice and also heat the cabin.

17 Claims, 8 Drawing Sheets

OPPORTUNISTIC SYSTEM AND METHOD FOR DE-ICING AN EXTERIOR HEAT EXCHANGER

FIELD

The present description relates generally to methods and systems for de-icing an exterior heat exchanger in a climate control system.

BACKGROUND/SUMMARY

Electric and hybrid vehicles may include heat pumps to adjust passenger cabin temperature. Exterior heat exchangers are provided in heat pump systems to facilitate cabin heating and cooling functionality. While operating under certain conditions, condensate may form on exterior locations of the heat exchanger, such as fins. Degradation of the heat exchanger's heat transfer functionality may stem from icing of the heat exchanger and can ultimately reduce the amount of cabin heating during a heating mode, for instance. Environmental factors such as rain, snow, sleet, etc., may also lead to heat exchanger icing, due to the exposed location of the heat exchanger.

Attempts were made to address the icing issues in Blatchley et al, U.S. 2016/0332504 A1, wherein a cooling mode fluid is sent to the exterior heat exchanger to de-ice from a coolant loop. Heated air to the cabin can be maintained during this cooling mode if there is either activation of a separate positive temperature coefficient (PTC) heater or through the use of engine coolant. This way, the cabin can be heated while also de-icing. Drawbacks to this system may include an increase in energy/fuel usage when heating the cabin. Additionally, electric vehicles without engines may rely on the PTC heaters alone for cabin heating. It may also be difficult to meet all cabin heating needs while de-icing using Blatchley's method. Other vehicle systems have attempted to de-ice heat pump heat exchanger's using superheated vapor from the compressor necessitating the stoppage of cabin climate control and increasing the likelihood of compressor degradation.

To at least partially address the above-mentioned disadvantages of the prior heat exchanger de-icing strategies, the inventors herein have developed a method for opportunistic de-icing of an exterior heat exchanger of a vehicle system with a heat pump. In the method a first mode of vehicle system operation is selected based on scheduled vehicle preconditioning or vehicle remote start. In the first mode the exterior heat exchanger and vehicle cabin are heated for de-icing and climate control, respectively, using thermal energy from a heat source (e.g., energy storage device) to operate the heat pump to generate the heat transferred to the exterior heat exchanger and vehicle cabin, when a cabin preconditioning event has been scheduled or a remote start has been requested. An advantage to the first mode is that both heat exchanger de-icing and cabin conditioning occur at overlapping times. Another advantage to this approach is to reduce interference between heat exchanger de-icing operation and cabin climate control operation. For example, the first mode may be implemented during a scheduled cabin preconditioning or remote start event to reduce the chance of de-icing delaying the vehicle cabin from reaching heating set-points when the passengers are on-board the vehicle.

In one example, the method may further include selecting a second mode of vehicle system operation when a temperature of the energy storage device is below a threshold temperature. In the second mode the heat pump operates using thermal energy drawn from the vehicle cabin to transfer the heat to the exterior heat exchanger to de-ice the exterior heat exchanger. In this way, the heat exchanger can be efficiently de-iced when the energy storage device temperature is below a threshold. Consequently, scenarios where the energy storage device is cooled beyond a desirable level can be avoided, if desired.

Advantages and features of the present description will be apparent from the detailed description to follow, either taken alone or in conjunction with the accompanying figures shown below. It should be known that the description above is intended to introduce in a simplified matter a number of concepts that are described further in the detailed description. This summary is not intended to elucidate key features of the claimed subject material, the scope of which is defined uniquely by the claims that follow the detailed description. In addition, the claimed subject matter is not limited to implementations that solve any disadvantages noted above or in any part of this disclosure.

DETAILED DESCRIPTION

Figure 1:
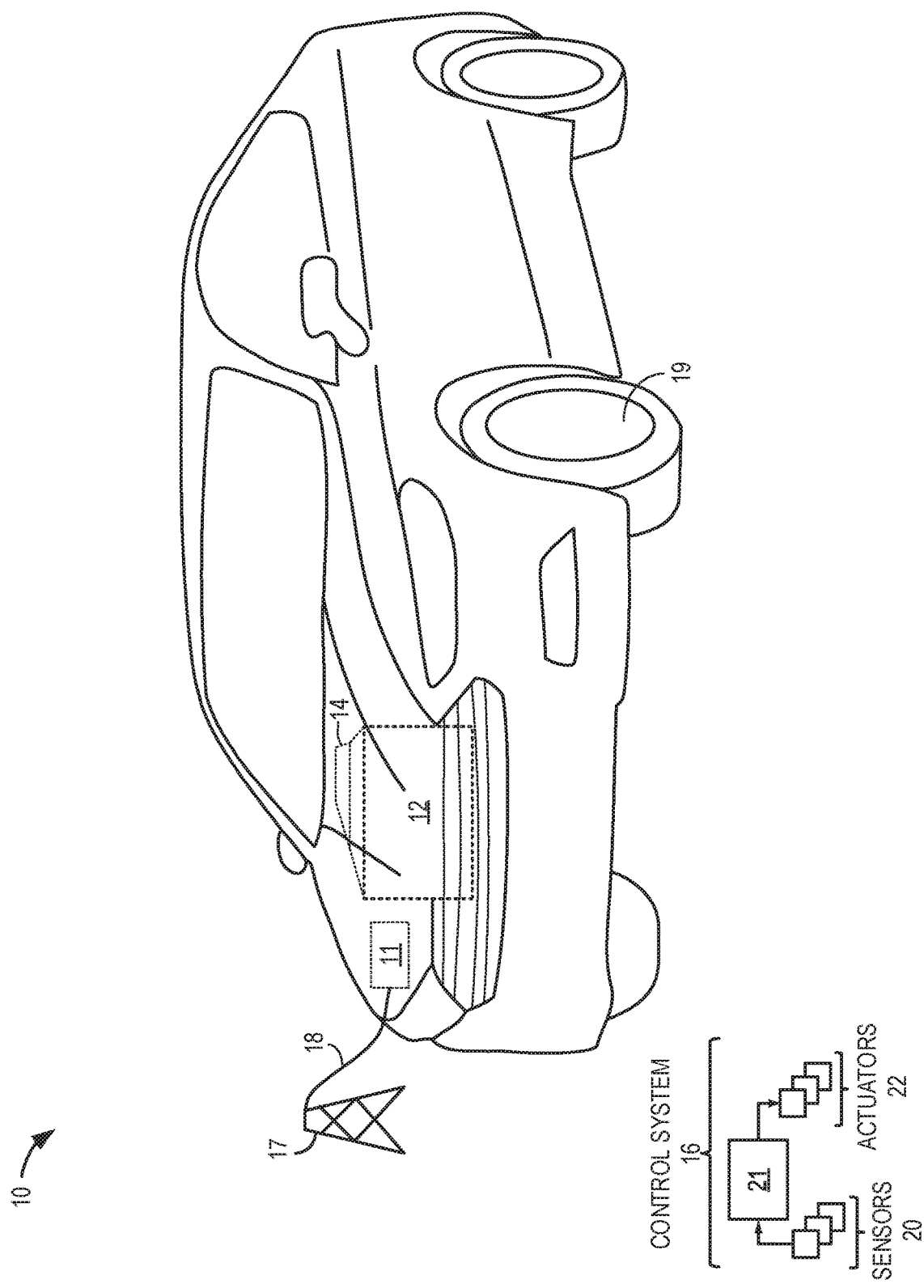
FIG. 1 is schematic diagram of a vehicle.
Figure 2:
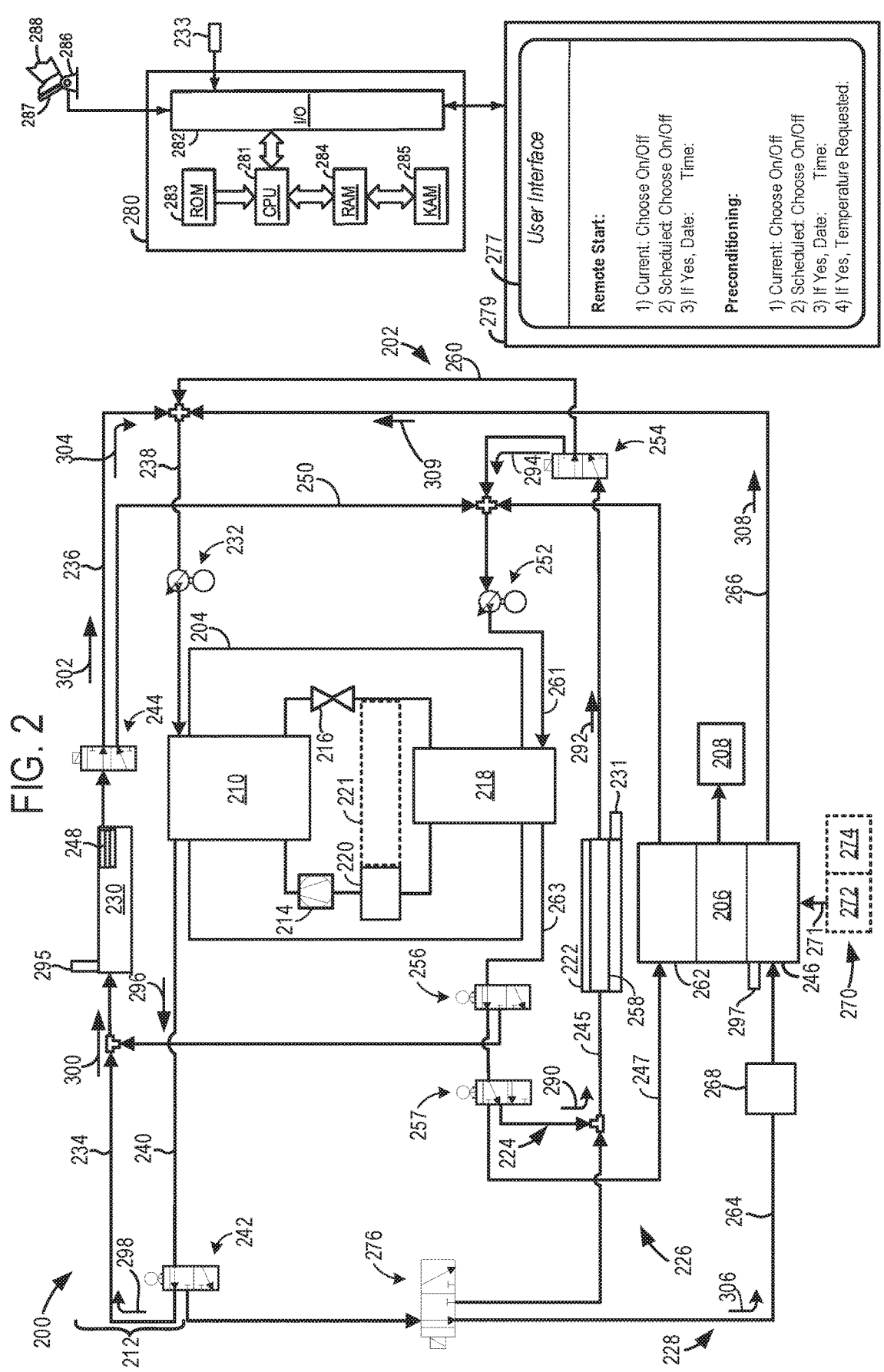
FIG. 2 shows an example vehicle climate control system, for the vehicle of FIG. 1, in a first operating mode.
Figure 3:
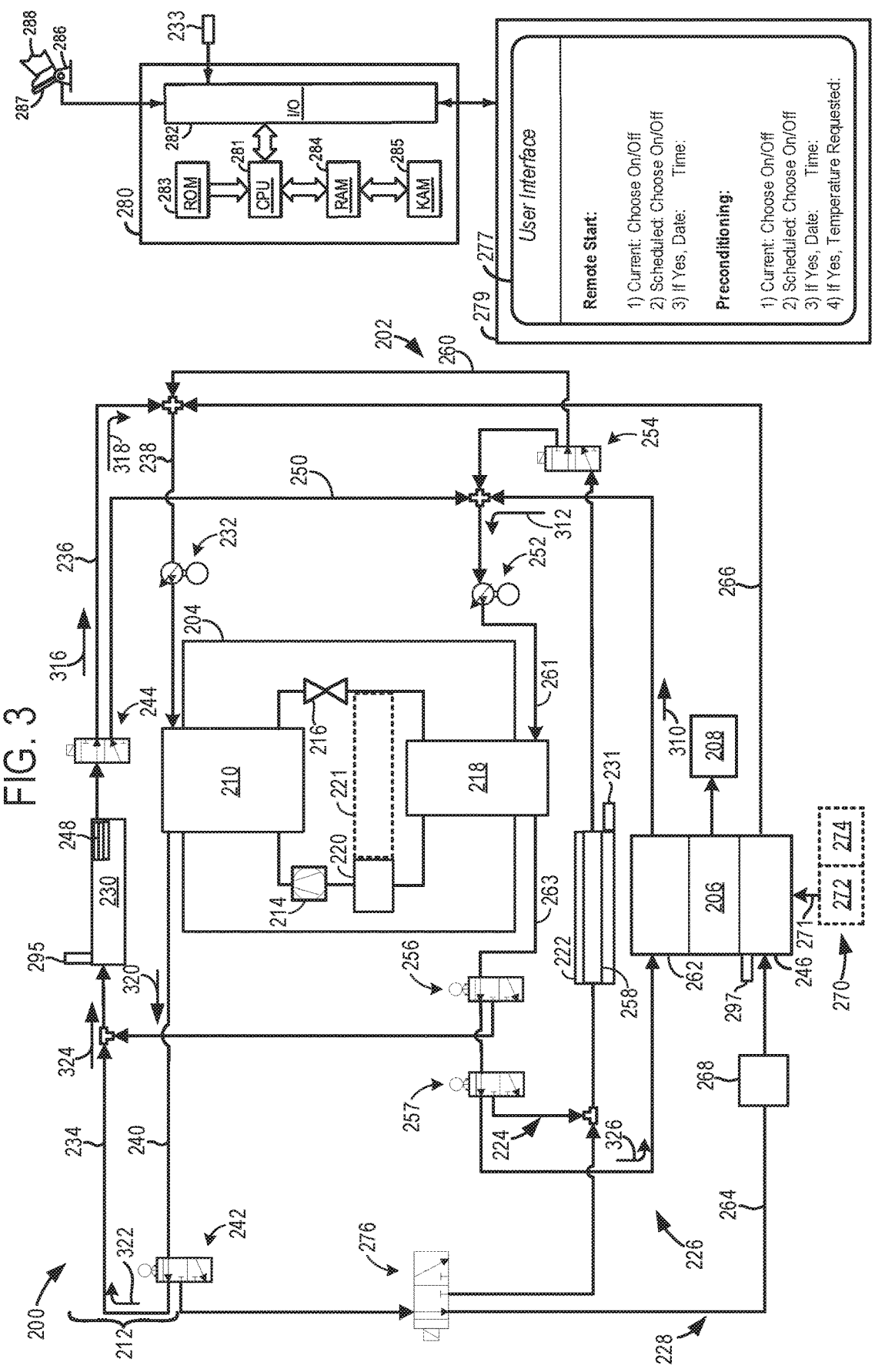
FIG. 3 shows an example vehicle climate control system, for the vehicle of FIG. 1, in a second operating mode.

The present description is related to a method for efficient de-icing of a heat exchanger in a climate control system. In particular, a vehicle's exterior heat exchanger may be de-iced in different modes depending on heat pump operating conditions, scheduled cabin preconditioning events, and/or vehicle remote start requests to allow heat exchanger de-icing and cabin conditioning to be efficiently carried out. The vehicle may be a passenger vehicle as is shown in FIG. 1 or a commercial vehicle (not shown). The vehicle includes a climate control system including a heat pump designed to operate in different heat exchanger de-icing modes, as shown in FIGS. 2 and 3. Exterior heat exchanger de-icing may be performed as shown in the operating method of FIGS. 4-6. The de-icing process may be performed as shown in the use-case operating sequences of FIGS. 7 and 8.

Referring to FIG. 1, a vehicle 10 including an internal combustion engine 12, an electric motor 14, and/or an energy storage device 11 are shown. The engine 12 may include cylinders, valves, etc., to enable the engine to implement a combustion process (e.g., four stroke combustion process) for motive power generation. The electric motor 14 is designed to generate motive power using energy from the energy storage device 11 and may include rotors, stators, etc., for power generation. A drive wheel 19 in the vehicle 10 may receive rotational energy generated via the engine 12 and/or electric motor 14 to propel the vehicle along a drive surface (not shown). The drive wheel is illustrated as a front wheel, however two-wheel drive, rear wheel drive, four wheel drive, etc., powertrain configurations have been envisioned.

In one example, the vehicle may include only electric motor 14 for propulsion and therefore may be referred to as a battery electric vehicle (BEV). The electric motor 14 may be supplied with electrical power via the energy storage device 11. Energy storage device may be recharged from an external energy source such as a stationary electrical power grid 17 (e.g., home or remote charging station), a portable energy source, solar charging station, etc., via electrical plug 18, capacitive charging, etc. In one example, energy storage device 11 may be a battery, capacitor, flywheel, and/or other suitable energy storage device.

In other examples, the vehicle 10 may harness motive energy from both the engine 12 and the electric motor 14 and therefore may be referred to as a hybrid electric vehicle. Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions.

The engine 12 may be controlled at least partially by a control system 16 including controller 21. Controller 21 may receive various signals from sensors 20 coupled to the engine 12 and/or electric motor 14 and send control signals to various actuators 22 coupled to the engine, motor, and/or vehicle to enable output of the engine and/or motor to be adjusted as desired.

A climate control system 200 is illustrated in FIGS. 2-3. It will be understood that the climate control system 200, shown in FIGS. 2 and 3 may be included in a vehicle such as the vehicle 10 illustrated in FIG. 1. The components, features, functions, etc., of the climate control system 200, therefore, may be included in the vehicle 10 or vice versa. Thus, the climate control system 200 is designed to provide heating and cooling control for a cabin of a vehicle, such as vehicle 10, illustrated in FIG. 1. Devices and fluidic passages, conduits, lines, etc., are shown as solid lines. The climate control system 200 may be conceptually divided into a coolant subsystem 202, heat pump subsystem 204 (e.g., heat pump circuit), and a ventilation subsystem 206. The working fluid in the coolant subsystem 202 is a coolant such as a mixture of water and glycol, a waterless coolant, etc. On the other hand, the working fluid in the heat pump subsystem 204 is a refrigerant. Therefore, the heat pump subsystem may be referred to as a refrigerant subsystem. The ventilation subsystem 206 is designed to transfer conditioned air (e.g., heated or cooled air) to a vehicle cabin 208. As such, the ventilation subsystem 206 may include conduits, ducts, passages, etc., to allow the conditioned air to be routed to the vehicle cabin 208.

The heat pump subsystem 204 may transfer thermal energy to and receive thermal energy from different circuits in the coolant subsystem 202, during different modes. As described herein, a circuit is a grouping of conduit(s), line(s), pump(s), valve(s), heat exchanger(s), etc., routing a working fluid (e.g., refrigerant, coolant, etc.,) along a desired path. Specifically in the illustrated example, the heat pump subsystem 204 includes a first coolant to refrigerant heat exchanger 210.

The first coolant to refrigerant heat exchanger 210, included in the climate control system 200, may transfer thermal energy from the heat pump subsystem to an exterior heat exchanger circuit 212, in the coolant subsystem 202, under some conditions. It will be appreciated that the first coolant to refrigerant heat exchanger 210 can therefore function as a condenser (e.g., gas cooler) in the heat pump subsystem 204. The first coolant to refrigerant heat exchanger 210 may include conduits, housings, etc., to facilitate thermal energy transfer between the coolant and refrigerant and therefore isolates the coolant from refrigerant. Furthermore, it will be appreciated that other coolant to refrigerant heat exchangers described herein also isolate coolant from refrigerant.

The heat pump subsystem 204 further includes a compressor 214 and an expansion valve 216 in the heat pump cycle. The compressor 214, when operating, pressurizes and circulates refrigerant through the heat pump subsystem 204. The expansion valve 216, when operating, controls an amount of refrigerant delivered to a second coolant to refrigerant heat exchanger 218. The second coolant to refrigerant heat exchanger may be a chiller, in one example. It will be understood that the compressor 214 and expansion valve 216 may be electrically operated.

An accumulator 220 may also be provided in the heat pump subsystem 204. The accumulator 220, when in operation, may act as a reservoir for storing residual liquid refrigerant so that vapor refrigerant rather than liquid refrigerant may be provided to the compressor 214. The accumulator 220 may include a desiccant that absorbs small amounts of water moisture from the refrigerant. Additionally, in one example, the accumulator 220 may include an internal heat exchanger 221. The internal heat exchanger 221 may be designed to transfer heat from refrigerant flowing to the input of the compressor to refrigerant downstream of the outlet of the expansion valve. It will be understood that the internal heat exchanger 221 may be used to increase the efficiency of the heat pump when a desired subcooling level at the outlet of the expansion valve has not been achieved, for instance.

The heat pump subsystem 204 also includes the second coolant to refrigerant heat exchanger 218. The second coolant to refrigerant heat exchanger 218, under certain conditions receives thermal energy from a heat source in the coolant subsystem 202. Specifically, in one example, the heat source may be an energy storage device 222 in an energy storage device cooling circuit 224 or an evaporator 262 (e.g., cooling core) in a cabin cooling circuit 226 in the coolant subsystem 202. However, other suitable heat sources in the climate control system have been envisioned such as an electric heater.

The coolant subsystem 202 may circulate coolant through various conduits to heat and cool selected components in different operating modes. In the illustrate example, the coolant subsystem 202 includes the exterior heat exchanger circuit 212, the energy storage device cooling circuit 224, a cabin heating circuit 228, and the cabin cooling circuit 226. However, other coolant subsystem arrangements have been envisioned with additional or alternative cooling and/or heating loops.

The exterior heat exchanger circuit 212 may be designed to circulate coolant through an exterior heat exchanger 230 and may include a pump 232 (e.g., electric pump), coolant conduits (234, 236, 238, and 240), valve 242, and/or valve 244. The pump 232 is configured to adjust an amount of coolant flow through the circuit and may include chambers, pistons, valves, rotors, etc., to enable said coolant flow adjustment. The other pumps described herein may also include any of the aforementioned types of components to achieve flow adjustment functionality in the corresponding coolant or refrigerant circuits. For instance, the other pumps described herein may be electrically operated pumps.

The valve 242 may permit and inhibit coolant flow from coolant conduit 234 to the exterior heat exchanger 230 and/or a heating core 246 in the cabin heating circuit 228 based on operating conditions. Additionally, the valve 242 may also permit and inhibit coolant flow to the valve 276. Thus, the valve may flow coolant to the exterior heat exchanger 230 and/or the valve 276 depending on operating conditions. It will be understood that the valve 242 as well as the other valves described herein may permit and inhibit working fluid flow to the components to which they are coupled as well as adjust the flowrate of the working fluid flowing to the component(s) to which they are coupled when flow is permitted.

When in operation, the exterior heat exchanger 230 transfers heat to or receives heat from the surrounding environment, depending on the system's mode of operation. The exterior heat exchanger 230 therefore may be positioned at an external location of the vehicle spaced away from the motor, engine, engine compartment, cabin, etc., for instance. The exterior heat exchanger 230 may include fins 248 allowing for the heat to be transferred to the ambient environment from the device or vice versa. It will be understood that the fins 248 and other exterior heat exchanger components may ice up due to condensate forming on the components and subsequently freezing, due to the ambient temperature and/or ice, snow, sleet, etc., accumulating on the fins and/or other components due to the exposed external location of the device. The heating core 246 provides heat to the ventilation subsystem 206 and therefore the vehicle cabin 208 during certain modes of operation. Thus, during operation the heating core 246 may function as a heat exchanger and may include coolant conduits, fins, plates, etc.

The valve 244 may selectively flow coolant to the first coolant to refrigerant heat exchanger 210 via coolant conduits (236 and 238), during certain operating conditions, and may selectively flow coolant to the energy storage device cooling circuit 224 during other conditions via coolant conduit 250, during other conditions.

The energy storage device cooling circuit 224 may include pump 252, valve 254, valve 256, valve 257, and/or energy storage device heat exchanger 258 (e.g., energy storage device cooler). It will be understood that the energy storage device cooler may act as a chiller to allow the heat pump circuit to transfer heat to the exterior heat exchanger for de-icing. The pump 252 may adjust coolant flow through the energy storage device cooling circuit 224. The energy storage device heat exchanger 258 is included in or coupled to the energy storage device 222 and when in operation circulates coolant to reduce the temperature of the energy storage device.

Additionally, the valve 254 may provide coolant flow from the energy storage device heat exchanger 258 to an input of the pump 252 in one configuration and in another configuration may provide coolant flow from the energy storage device cooling circuit 224 to the exterior heat exchanger circuit 212 via coolant conduit 260. A coolant conduit 261 connects the pump 252 to the second coolant to refrigerant heat exchanger 218 and a coolant line 263 connects the second coolant to refrigerant heat exchanger 218 to the valve 256, in the illustrated example. However, other conduit arrangements may be used, in other examples.

The valve 256 may selectively provide coolant to the valve 257 during certain modes and may selectively provide coolant flow to the exterior heat exchanger circuit 212 in other modes. Additionally, the valve 257 may provide coolant flow to cabin cooling circuit 226 or to the energy storage device heat exchanger 258, under different conditions.

The cabin cooling circuit 226 may include the evaporator 262 (e.g., cooling core). The evaporator 262 may reduce the temperature of air flowing through the ventilation subsystem 206, during certain operating conditions. In this way, the vehicle cabin 208 can be cooled.

The cabin heating circuit 228 may include the heating core 246 and coolant conduits 264, 266. The cabin heating circuit 228 may receive heated coolant from the exterior heat exchanger circuit 212, during certain conditions. The cabin heating circuit 228 may further include an electric heater 268 (e.g., positive temperature coefficient (PTC) heater, resistance heater, thermoelectric heater, etc.) Thus, the electric heater may receive electrical energy from the energy storage device while operating (i.e., transferring heat to coolant flowing to the heating core).

The heating core 246 may, in one example, additionally receive heat from an engine cooling loop 270, indicated via arrow 271. The engine cooling loop 270 may include a heat exchanger 272 (e.g., radiator), coolant conduits (not shown) routed through an engine 274, a pump (not shown), valves (not shown), etc. In this way, engine heat may also be used for cabin heating. It will be understood that engine 274 is an example of engine 12, shown in FIG. 1. However, in the electric vehicle embodiment the engine heat exchanger 272 and engine 274 may be omitted from the system.

A valve 276 may also provide fluidic coupling between the exterior heat exchanger circuit 212 and the cabin heating circuit 228 in one configuration. In another configuration, the valve 276 may provide fluidic coupling between the exterior heat exchanger circuit 212 and the energy storage device cooling circuit 224.

FIGS. 2 and 3 also show a controller 280 in the vehicle climate control system 200. Specifically, controller 280 is shown in FIGS. 2 and 3 as a conventional microcomputer including: microprocessor unit 281, input/output ports 282, read-only memory 283, random access memory 284, keep alive memory 285, and a conventional data bus. However, numerous controller arrangements have been envisioned. Additionally, the controller 280 is also configured to receive a pedal position from a pedal position sensor 286 couples to a pedal 287 actuated by an operator 288.

Additionally, the controller 280 may be configured to trigger one or more actuators and/or send commands to components. For instance, the controller 280 may trigger adjustment of the pump 232, pump 252, valve 242, valve 244, valve 254, valve 256, valve 257, valve 276, compressor 214, expansion valve 216, ventilation subsystem 206, electric heater 268, etc. Specifically in one example, the controller 280 may send signals to an actuator in the coolant pump 252 to induce adjustment in coolant flow. In another example, the controller may send signals to an actuator in valve 257 to permit coolant flow through the coolant line 245 leading to the energy storage device 222 and substantially inhibit coolant flow through the coolant line 247 leading to the cooling core. The other adjustable components receiving commands from the controller may also function in a similar manner. Therefore, the controller 280 receives signals from the various sensors and employs various actuators to adjust vehicle operation based on the received signals and instructions stored in memory (e.g., non-transitory memory) of the controller.

The controller 280 may also receive signals from sensors in the climate control system 200 and/or engine 274. The sensors providing input into the controller may include temperature sensor 231, temperature sensor 295, temperature sensor 297, ambient temperature sensor 233, pressure and/or temperature sensors in the heat pump subsystem (not shown), etc. The controller 280 may determine the occurrence of different events, conditions, etc., from the sensor input. For instance, the ambient temperature sensor may be used to determine if the exterior heat exchanger is experiencing icing or anticipated to experience icing. Additionally or alternatively, a weather forecast may be used to determine if an icing condition is present or anticipated to occur or if there is an absence of an icing condition.

Additionally, the controller 280 may receive preconditioning scheduling inputs from user interaction with a user interface (UI) 277 (e.g., graphical user interface (GUI)) presented on a display 279 and/or other suitable input devices (e.g., voice commands, control panels, etc.) The UI may be touch enabled and/or may be designed for use with peripheral devices such as touch pads, keyboards, mice, etc. The display may be located in the vehicle cabin, in an external computing device (e.g., portable computing device), etc.

The UI 277 allows a driver to designate one or more scheduled preconditioning events via user input. The preconditioning inputs may include preconditioning scheduling data (e.g., dates, times, etc.,) cabin conditioning set-points (e.g., desired cabin temperature, a heating set-point, a cooling set-point, etc.) For example, a user may schedule a preconditioning event each weekday at an expected time of home departure. However, numerous scheduling scenarios have been contemplated. Furthermore, the preconditioning event may designate a desired cabin temperature and vehicle departure time. Thus, when a preconditioning event is scheduled, sometime prior to the departure time, the climate control system may be turned on and operated to allow the cabin to achieve the desired temperature. The UI 277 may also be used to trigger a remote start, in some instances. For example, a user may schedule a remote start for a future date and time or presently initiate remote start operation. In such an example, the UI may be included in a portable computing device (e.g., smartphone, laptop, etc.) In other examples, the remote start request may be received from a remote device separate from the graphical user interface such as a key fob with remote start capabilities. In this way, a driver can start the vehicle prior to entering the vehicle cabin, if desired.

The controller 280 is may operate climate control system 200 in a variety of modes based on vehicle operating conditions, ambient conditions, etc. FIGS. 2 and 3 illustrate different modes of system operation that may be employed for de-icing the exterior heat exchanger. Although, de-icing modes are discussed, the climate control system may be operated in other modes to heat or cool the cabin when de-icing is not desired. Controller 280 may be programmed with computer readable data representing instructions executable to perform the methods described below as well as other variants that are anticipated but not specifically listed.

FIG. 2 specifically shows a first mode of operation where exterior heat exchanger de-icing and cabin heating occur at overlapping time intervals. In this way, exterior heat exchanger de-icing operation does not delay or otherwise interfere with cabin heating. Potential benefits to this approach include quicker preparation of the vehicle for comfortable occupancy and operation. Another benefit of the first method may include more efficient use of energy in the system by utilizing excess thermal energy from the energy storage device 222.

In the first mode, illustrated in FIG. 2, the climate control system 200 is operated using excess thermal energy from the energy storage device 222 to provide joint heating of the vehicle cabin 208 and de-icing of the exterior heat exchanger 230. In general, excess thermal energy from the energy storage device 222 is utilized to operate the heat pump. In turn, the heat pump expels thermal energy to a coolant that is then transferred to the exterior heat exchanger 230 for de-icing and the passenger cabin 208. To elaborate, coolant in the energy storage device cooling circuit 224 is heated with excess heat from the energy storage device 222 and flowed to the second coolant to refrigerant heat exchanger 218, indicated via arrows 292, 294. The second coolant to refrigerant heat exchanger 218 absorbs heat from coolant, thereby functioning as a chiller. The absorption of heat at the second coolant to refrigerant heat exchanger 218 (e.g., chiller) allows the heat pump subsystem to be operated to expel heat to the exterior heat exchanger circuit 212 and cabin heating circuit 228 for cabin heating and exterior heat exchanger de-icing. In this way, the heat pump subsystem may be efficiently operated using excess thermal energy in the energy storage device to quickly achieve both heat exchanger de-icing and cabin heating. In the first mode, coolant may also pass through conduit 236 towards valves 256 and 257, following arrow 290, through the junction and returning to energy storage device 222.

During the first mode in the second coolant to refrigerant heat exchanger 218 (e.g., chiller) of the heat pump subsystem 204, refrigerant may be evaporated to the gas phase and thermal energy from the coolant is utilized for this purpose. Gaseous refrigerant from accumulator 220 may proceed to the compressor 214. The refrigerant may then be re-pressurized at compressor 214. Passing to coolant to the first refrigerant heat exchanger 210, the re-pressurized refrigerant upon condensation may then donate thermal energy to the subsequent pathways. Refrigerant flow may be regulated by expansion valve 216.

Additionally, in the first mode, from coolant to refrigerant heat exchanger 210, coolant flows through conduit 240 towards valve 242, indicated via arrow 296. Valve 242 then directs coolant into exterior heat exchanger circuit 212 and cabin heating subsystem 228. In exterior heat exchanger circuit 212, warmed coolant flows to exterior heat exchanger 230 to de-ice via conduit 234, indicated via arrows 298 and 300. Fins 248 and other components of exterior heat exchanger 230 may then be de-iced by the warmed coolant fluid. Coolant may then return to coolant to refrigerant heat exchanger 210 via valve 244, conduit 236, following arrows 302 and 304, through pump 232 in conduit 238.

In cabin heating subsystem 228, warmed coolant may be passed through electric heater 268 following arrow 306. It will also be appreciated that in the first mode, electric heater 268 may not be operated. However, in other examples, the electric heater may be operated to assist in cabin heating operation. Coolant may then pass to heating core 246 of the ventilation subsystem 206 via coolant conduit 264. Thermal energy contained within the coolant fluid is then donated to the ventilation subsystem through heating core 246 and to vehicle cabin 208. Temperature reduced coolant is then routed through conduits 266 and 238 before returning to the first coolant to refrigerant heat exchanger 210, indicated via arrows 308, 309 where it again receives thermal energy from the refrigerant in the heat pump subsystem. In the first mode, coolant flow through the cabin cooling circuit 226 may be substantially shutdown. In this way, the cabin cooling may not interfere with cabin heating in the first mode.

FIG. 3 specifically shows a second mode of operation where de-icing of the exterior heat exchanger heating occurs prior to cabin heating. In certain situations, a vehicle may have a remote start or preconditioning event scheduled where de-icing and cabin warming are desired. However since departure is not immediate, an offset time can occur where additional time is added to the time allotted for vehicle preconditioning. This time may be used to sequentially de-ice the outside heat exchanger using cabin heat and then heat the passenger cabin before departure. The second mode allows de-icing of the exterior heat exchanger to be efficiently carried out by using latent cabin heat to operate the heat pump. Potential benefits to this approach may include allowing de-icing to occur even when the energy storage device is not at a threshold temperature. Another benefit of expanding the duration or preconditioning is the avoidance of passenger inconvenience by starting the preconditioning event earlier than anticipated to accommodate for both cabin heating and heat exchanger de-icing operation to occur. The opportunistic use of different modes allow modes to be efficiently tailored to different use situations.

In the second mode, illustrated in FIG. 3, the cabin cooling circuit 226 may circulate coolant to transfer thermal energy from evaporator 262 and cabin 208 to the exterior heat exchanger 230. Thermal energy from cabin 208 heats coolant which proceeds as shown via arrows 310 and 312 through pump 252 and towards second coolant to refrigerant heat exchanger 218 via conduit 261 in heat pump subsystem 204. As mentioned above, the coolant and refrigerant are kept fluidly separated. At the second coolant to refrigerant heat exchanger 218, refrigerant may be evaporated to the gas phase and thermal energy from the coolant is utilized for this purpose. The refrigerant may then be re-pressurized to the liquid phase at compressor 214. Passing to coolant to refrigerant heat exchanger 210, the re-pressurized refrigerant may then donate thermal energy to the subsequent pathways. Flow in the refrigerant loop is metered by expansion valve 216.

In exterior heat exchanger circuit 212 from coolant to refrigerant heat exchanger 210, coolant is passed to valve 242 via conduit 240. Valve 242 is closed such that coolant proceeds via arrows 314, through conduit 234 towards exterior heat exchanger 230. Fins 248 and/or other components of exterior heat exchanger 230 may then be de-iced by warmed coolant. Coolant may then return to coolant to refrigerant heat exchanger 210 through conduits 236 and 238 via valve 244 and pump 242. In the second mode, coolant flow from valve 276 towards energy storage device 222 and then towards valve 254 may be substantially inhibited. Specifically, in one example, substantially no coolant may be passed between exterior heat exchanger circuit 212 and cabin cooling circuit 226. Additionally, in one example, substantially no coolant flows may flow from valve 242 to valve 276, from valve 276 to heating core 246 and/or energy storage device 222. In this way, the evaporator 262 is in the coolant loop is used to operate the heat pump cycle.

In the second mode, arrows 316 and 318 indicate the flow of coolant from the exterior heat exchanger 230 to the pump 232. Additionally, arrow 320 indicates the flow of coolant from the first coolant to refrigerant heat exchanger 210 to the valve 242 and arrows 322 and 324 indicates the flow of coolant from the valve 242 to the exterior heat exchanger 230. Additionally, arrow 326 indicates the flow of coolant from the valve 257 to the evaporator 262. Therefore, in the second mode coolant circulates around the exterior heat exchanger circuit 212 and the cabin cooling circuit 226. However, in the second mode coolant flow may be substantially inhibited in the cabin heating subsystem 228 and/or the energy storage device cooling circuit 224.

The climate control system 200 illustrated in FIGS. 2 and 3 may also be operated in a third mode during certain conditions. In the third mode of operation the electric heater 268 is utilized for de-icing. In one instance, the third mode may be implemented when the vehicle is not plugged into an external energy source. The third mode may also be implemented when a preconditioning event or remote start is not scheduled. It will be understood that the third mode is not implemented during the first and second modes of system operation. Thus, each of the modes discussed herein may be implemented during distinct non-overlapping times. Moreover, in some examples, the modes may be transitioned between depending on operating conditions. For instance, the first mode may transition to the second mode when the energy storage device temperature falls below a threshold value.

In the third mode the climate control system 200 is operated using the electric heater 268 to provide de-icing of the exterior heat exchanger 230. To elaborate, coolant in the cabin heating circuit is heated via electric heater 268 and flowed to the heating core 246, heating the cabin, before then flowing to first coolant to refrigerant heat exchanger 210. From coolant to refrigerant heat exchanger 210, coolant is passed through conduit 240 towards valve 242. In the third mode, valve 242 may split the coolant flow into exterior heat exchanger circuit 212 and cabin heating subsystem 228. In exterior heat exchanger circuit 212, warmed coolant flows to exterior heat exchanger 230 for de-icing via conduit 234. Fins 248 and other components of exterior heat exchanger 230 may then be de-iced by warmed coolant fluid. Coolant may then return to coolant to refrigerant heat exchanger 210 via valve 244, conduit 236 and pump 242 in conduit 238. In cabin heating subsystem 228, coolant may return to electric heater 268 following arrow 306. One potential effect of the third mode is to utilize electric heater 268 for de-icing when the vehicle is not plugged in and/or when a remote start or preconditioning is not requested, for example. In this way, the exterior heat exchanger can be de-iced during another set of operating conditions to increase the system's applicability. It will be understood, that the cabin 208 may also be heated during the third mode using the electric heater 268.

The different modes may be selected using a number of different factors. For instance, the entry conditions for the first mode may include one or more of the following conditions: a condition where icing of the exterior heat exchanger is present, a condition where the energy storage device temperature is above a threshold value (e.g., 0-5 degrees Celsius), a condition where the energy storage device is coupled to an external energy source (e.g., a condition where the vehicle is plugged into the power grid), a condition where pre-conditioning or remote start is occurring. When the first mode is implemented responsive to the energy storage device is above a threshold value, excess thermal energy in the energy storage device may be harnessed to run the heat pump that can generate heat for heat exchanger de-icing and cabin heating while the vehicle is plugged in.

Icing of the exterior heat may be considered present if the ambient temperature or the temperature of the heat exchanger is below a certain threshold (e.g., 0° C., −5° C., −10° C., etc.,) and/or if there is the presence of ice-inducing weather such as snow, sleet, hail, etc. For instance, an ambient temperature sensor, weather data, etc., may be used to determine if there is a presence of icing on the exterior heat exchanger.

The entry conditions for the second mode may include one or more of the following conditions: a condition where icing on the exterior heat exchanger is present, a condition where the energy storage device temperature is below a threshold value, and a condition where a preconditioning or remote start event is scheduled or occurring, and a condition where the energy storage device is coupled to an external energy source. Therefore, the second mode may be implemented when the energy storage device is operating below the threshold temperature. In the second mode, the heat pump is operated by cooling the cabin to efficiently generate heat for exterior heat exchanger de-icing. The entry conditions for the third mode may include one or more of the following conditions: a condition where icing of the exterior heat exchanger is present, a condition where the energy storage device is not coupled to an external energy source, and a condition where there is no remote start or preconditioning event scheduled or occurring.

Figure 4:
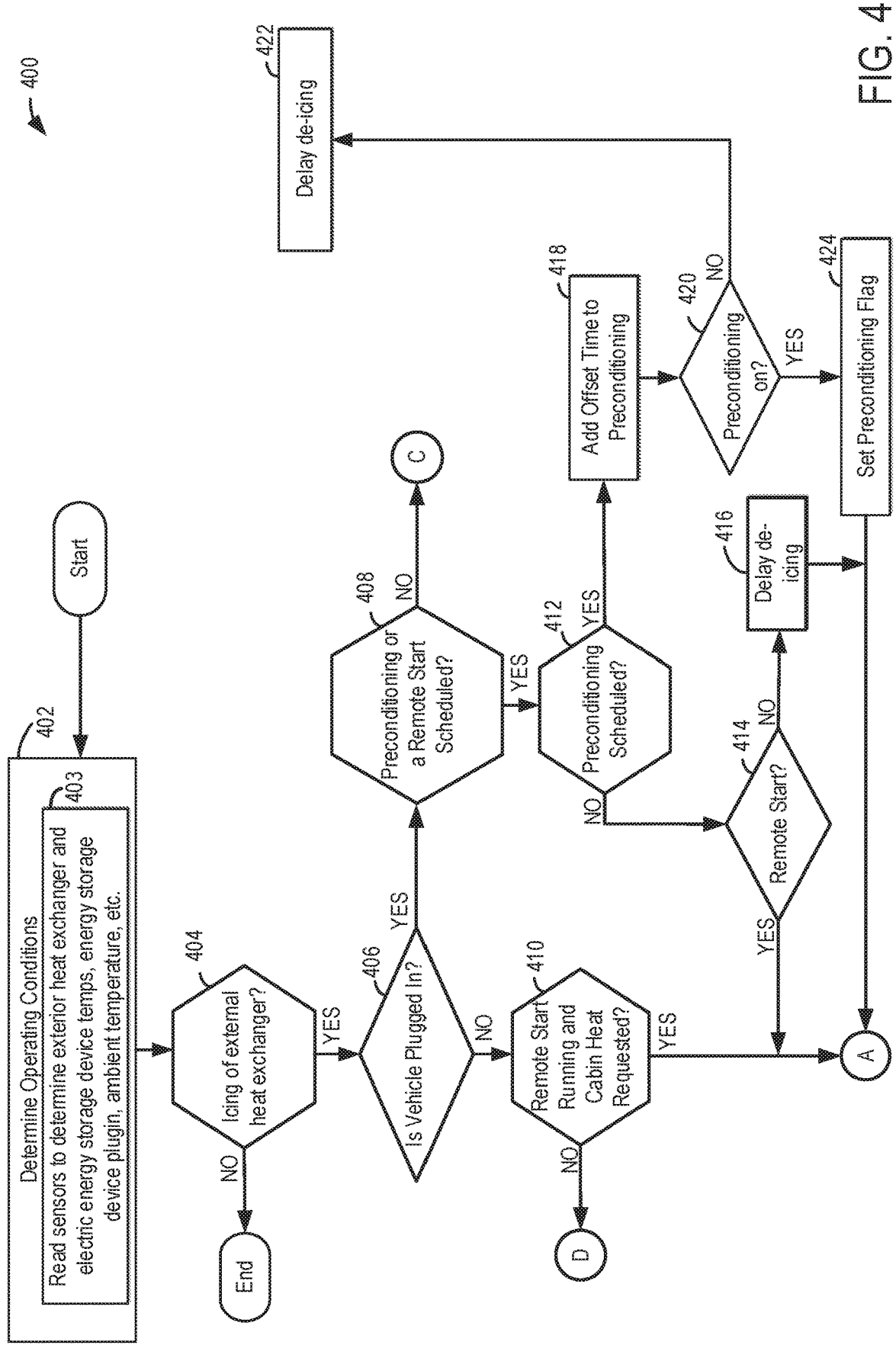
FIGS. 4-6 show a method for operating a vehicle climate control system.
Figure 5:
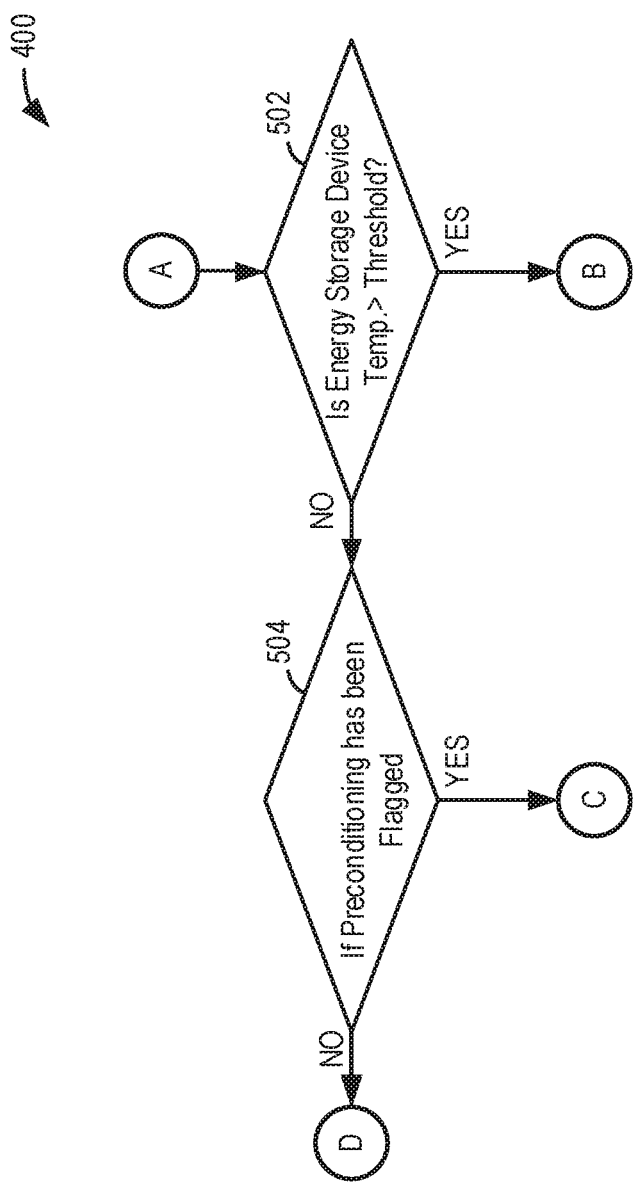
Figure 6:
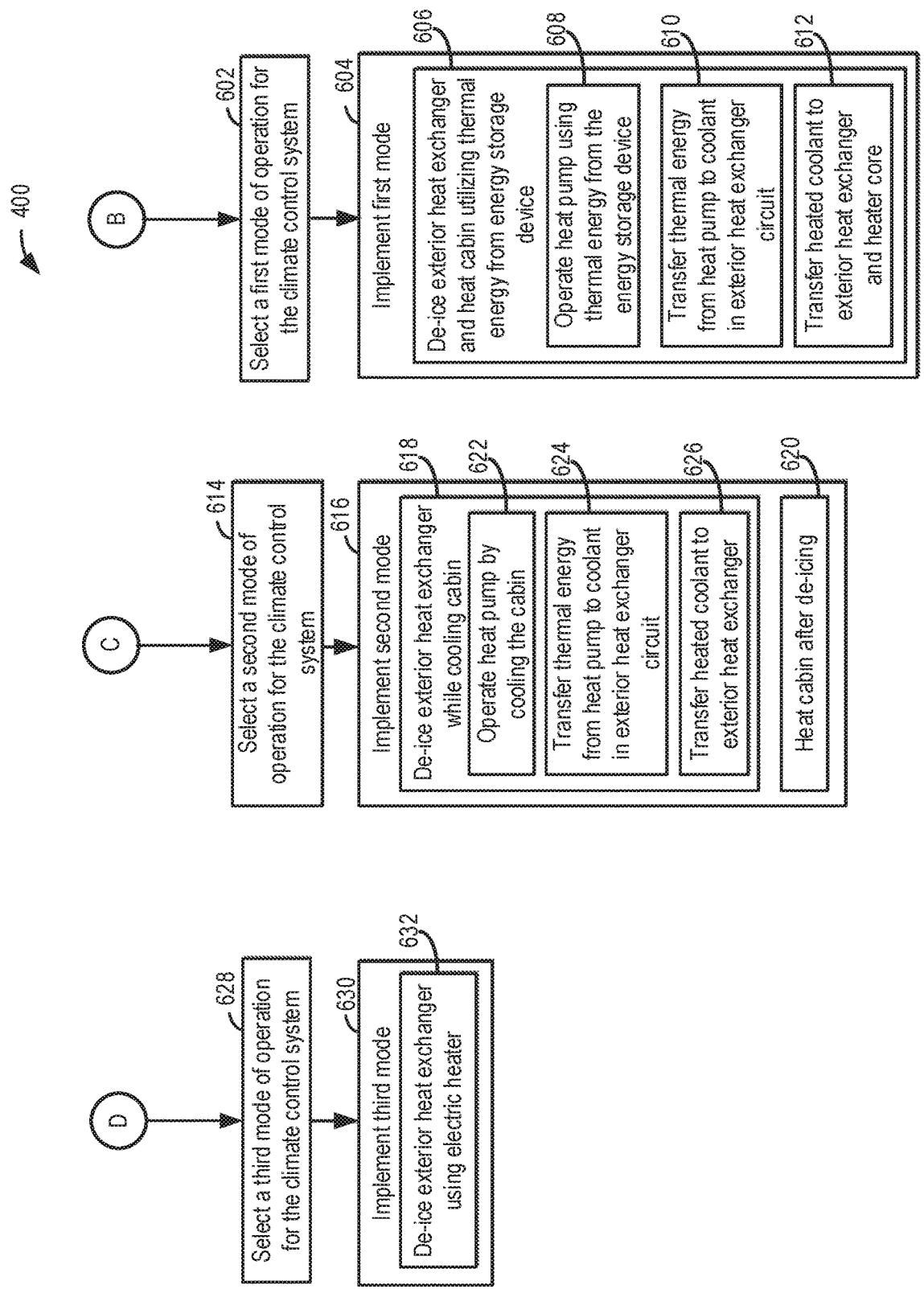

Referring now to FIGS. 4-6, a method 400 for de-icing an exterior heat exchanger is shown. It will be understood, that the method 400 may be implemented via the vehicle, climate control system, system components (e.g., controller, actuators, sensors, etc.,), etc., described above with regard to FIGS. 1-3. However, in other examples, the method 400 may be implemented by other suitable vehicles, climate control systems, components, etc. Furthermore, method 400 of FIGS. 4-6 may be stored in non-transitory memory of a controller, such as controller 280 of FIGS. 2 and 3. Method 400 may include instructions within a controller as well actions taken by the controller, such as changing an operating state of valves, pumps, compressors, etc.

At 402, method 400 determines operating conditions of the vehicle. Determining the vehicle's operating conditions may include at 403 reading sensors to determine exterior heat exchanger and electric energy storage device temperatures, energy storage device plugin, ambient temperature, etc. It will be understood that some operating conditions may be determined by modeling the operating conditions using sensor data. Method 400 then proceeds to 404.

At 404, method 400 determines whether icing of exterior heat exchanger (e.g., exterior heat exchanger 230) is present or absent. In this way, the presence of exterior heat exchanger icing may be ascertained. For example, the temperature of the exterior heat exchanger, the ambient temperature, weather forecast data, combinations thereof, etc., may be used to determine if heat exchanger icing is occurring. For instance, if the ambient temperature and/or exterior heat exchanger temperature are below 0° C., −1° C., −5° C., etc., it may be indicated that there is a presence of icing on the exterior heat exchanger. On the other hand, when the ambient temperature and/or exterior heat exchanger temperature are above 0° C., −1° C., −5° C., etc., it may be determined that icing of the exterior heat exchanger is not occurring. In another example, a weather forecast of ice, sleet, snow, etc., may be used to determine if icing of the exterior heat exchanger is occurring. It will be understood that numerous techniques for ascertaining the likelihood of heat exchanger icing have been contemplated.

If method 400 judges that the exterior heat exchanger is iced, the answer is yes and method 400 proceeds to 406. Otherwise, the answer is no and method 400 ends. However, in other examples if it is determined that icing of the exterior heat exchanger is not occurring the method may return to 402.

At 406, method 400 judges whether or not the energy storage device in the vehicle is electrically coupled to an external power source. In one example, method 400 may judge that the vehicle is electrically coupled to an external energy source based on a voltage sensed at the electrical connector attached to the external energy source. If method 400 judges that the vehicle is electrically coupled to the external energy source, the answer is yes and method 400 proceeds to 408. Otherwise the answer is no and the method 400 proceeds to 410.

At 408, the method judges whether or not either a preconditioning or a remote start has been requested. As previously discussed, remote start and/or preconditioning may be requested by the controller responsive to user interaction with a graphical interface, interaction with a remote device (e.g., a remote start key fob, portable computing device, etc.,) automatically by the controller, etc. If method 400 judges that either preconditioning or remote start is requested, the answer is yes and method proceeds to 412. Otherwise, the answer is no and method 400 proceeds to 614 in FIG. 6.

At 410, method 400 judges whether or not a remote start is running and cabin heating is requested. If method 400 judges that both a remote start and cabin heat requested, the answer is yes and method 400 proceeds to 502 FIG. 5. Otherwise, the answer is no, and the method 400 proceeds to 628, shown in FIG. 6.

At 412, method 400 judges whether or not cabin preconditioning is scheduled. If method 400 judges that preconditioning is scheduled, the answer is yes and method 400 proceeds to 418. Otherwise, the answer is no and method 400 proceeds to 414.

At 414, method 400 judges whether or not a remote start has been requested. If method 400 judges that a remote start is requested, the answer is yes and method 400 proceeds to 416. Otherwise, the answer is no and method 400 proceeds 502, shown in FIG. 5. At 416 the method delays the de-icing until remote start is active. In this way, de-icing is postponed because remote start has been scheduled but not currently active. Once remote start is active, the method may proceed to 502, shown in FIG. 5, from 416, shown in FIG. 4.

At 418, method 400 adds an offset time to the total preconditioning time to condition the vehicle cabin. For instance, a start time of the cabin preconditioning may be advanced to accommodate for the heat exchanger de-icing strategy. In this way, the preconditioning may start earlier to allow a sufficient amount of time for both heat exchanger de-icing and cabin preconditioning operation. Furthermore, the advancing of the pre-conditioning start time may be carried out responsive to expected implementation of the first and/or second modes of operation or in response to implementation of the first and/or second modes of operation. In this way, the duration of cabin preconditioning can be adjusted to allow the de-icing and cabin heating strategies to unfold prior to vehicle occupancy.

Next at 420, method 400 judges whether or not preconditioning is currently on. If the method judges that preconditioning is not occurring, then method 400 proceeds to 422. At 422 de-icing is delayed until preconditioning is active. The de-icing may be delayed since the preconditioning event has been scheduled but is not currently being implemented. On the other hand, if the method judges that preconditioning is occurring the method moves to 424. At 424, method 400 sets a preconditioning flag. The preconditioning flag indicates that the preconditioning event is occurring.

Turning to FIG. 5, at 502, method 400 determines whether energy storage device (e.g., energy storage device 222) is above or below a certain temperature threshold (e.g., 0-5 degrees Celsius). The threshold temperature may correspond to a temperature at which a targeted energy storage device output can be achieved. This may be determined by relevant temperature sensors. If the method determines the energy storage device is greater than the threshold temperature, then method 400 proceeds to 602 shown in FIG. 6. Otherwise, the answer is no and the method 400 proceeds to 504.

At 504, method 400 determines whether preconditioning has been flagged. If there is a preconditioning flag, then the method proceeds to 614 shown in FIG. 6. Otherwise, the answer is no and method proceeds to 628, shown in FIG. 6.

In FIG. 6, at 602, a first mode of system operation is selected. At 604, the first mode of heat pump operation is implemented. Implementing the first mode may include step 606. At 606 the method includes de-icing the exterior heat exchanger and heating the vehicle cabin utilizing thermal energy from energy storage device which may include steps 608-612. At 608 the method includes operating heat pump using thermal energy from the energy storage device. For instance, the second coolant to refrigerant heat exchanger may receive coolant heated by excess thermal energy in the energy storage device. In turn, the heat pump is operated to transfer thermal energy from the first coolant to refrigerant heat exchanger to the exterior heat exchanger circuit for de-icing of the exterior heat exchanger. It will be understood, that one or more of valve 242, valve 254, valve 256, valve 257, pump 244, pump 252, compressor 214, and/or expansion valve 216 may be adjusted to place the system in the first mode of operation. In this way, the heat pump can be operated using excess thermal energy in the energy storage device and generate heat for exterior heat exchanger de-icing and cabin heating.

At 614, a second mode of system operation is selected. Next at 616, the second mode of heat pump operation is implemented. Implementing the second mode may include steps 618 and 620. At 618 the method includes de-icing the exterior heat exchanger while cooling cabin. Step 618 may include steps 622, 624, and step 626. At 622 the method includes operating the heat pump while cooling the vehicle cabin. For example, heat from the vehicle cabin may be transferred to coolant and the heated coolant may be transferred to the second coolant to refrigerant heat exchanger. In this way, the heat pump can be cycled to transfer heat from the first coolant to refrigerant heat exchanger to the exterior heat exchanger circuit for exterior heat exchanger de-icing. At 624 the method includes transferring thermal energy from the heat pump to coolant in exterior heat exchanger circuit and at 626 the method includes transferring heated coolant to exterior heat exchanger. In this way, the heat pump may be used for efficient de-icing of the exterior heat exchanger.

At 620 the method includes heating the cabin after de-icing the exterior heat exchanger. For example, the heat pump and/or electric heater may be operated to generate heat for cabin heating. It will be understood that step 620 occurs after the occurrence of step 618. It will also be understood that one or more pumps 232, 252; valves 216, 242, 244, 256, 257, 276; compressor 214; and/or electric heater 268 may be adjusted to place the system in the second operating mode.

At 628, a third mode of system operation is selected. Next at 630, the third mode is implemented. Implementing the third mode may include step 632 where the method comprises de-icing the exterior heat exchanger. De-icing the exterior heat exchanger may include flowing heated coolant from the electric heater to the exterior heat exchanger. It will be understood that one or more of pumps 232, 252; valves 216, 242, 244, 256, 257, 276; compressor 214; and/or electric heater 268 may be adjusted to place the system in the third operating mode.

Figure 7:
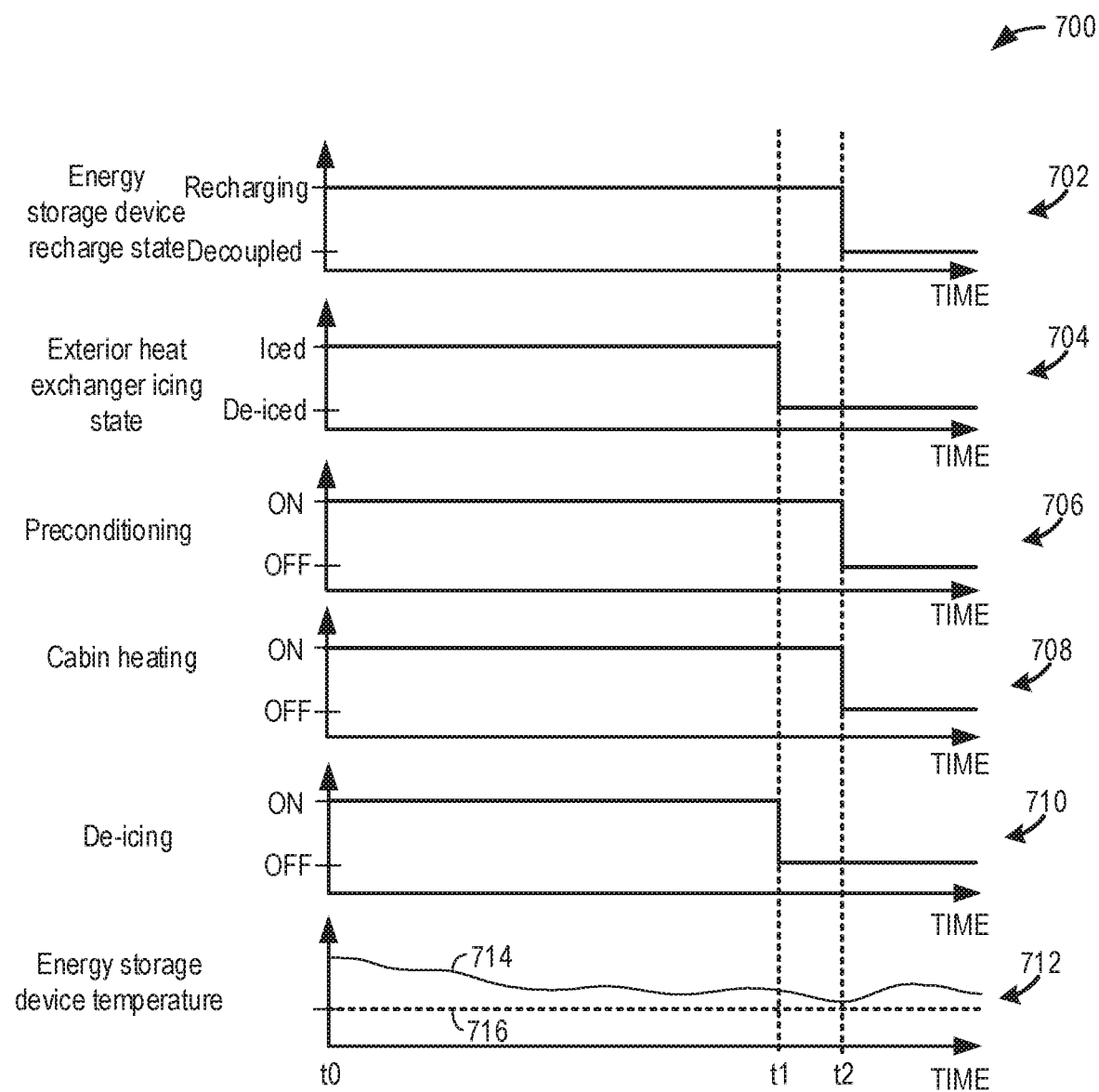
FIGS. 7 and 8 show a use-case operating sequence for a vehicle climate control system according to the method of FIGS. 4-6.
Figure 8:
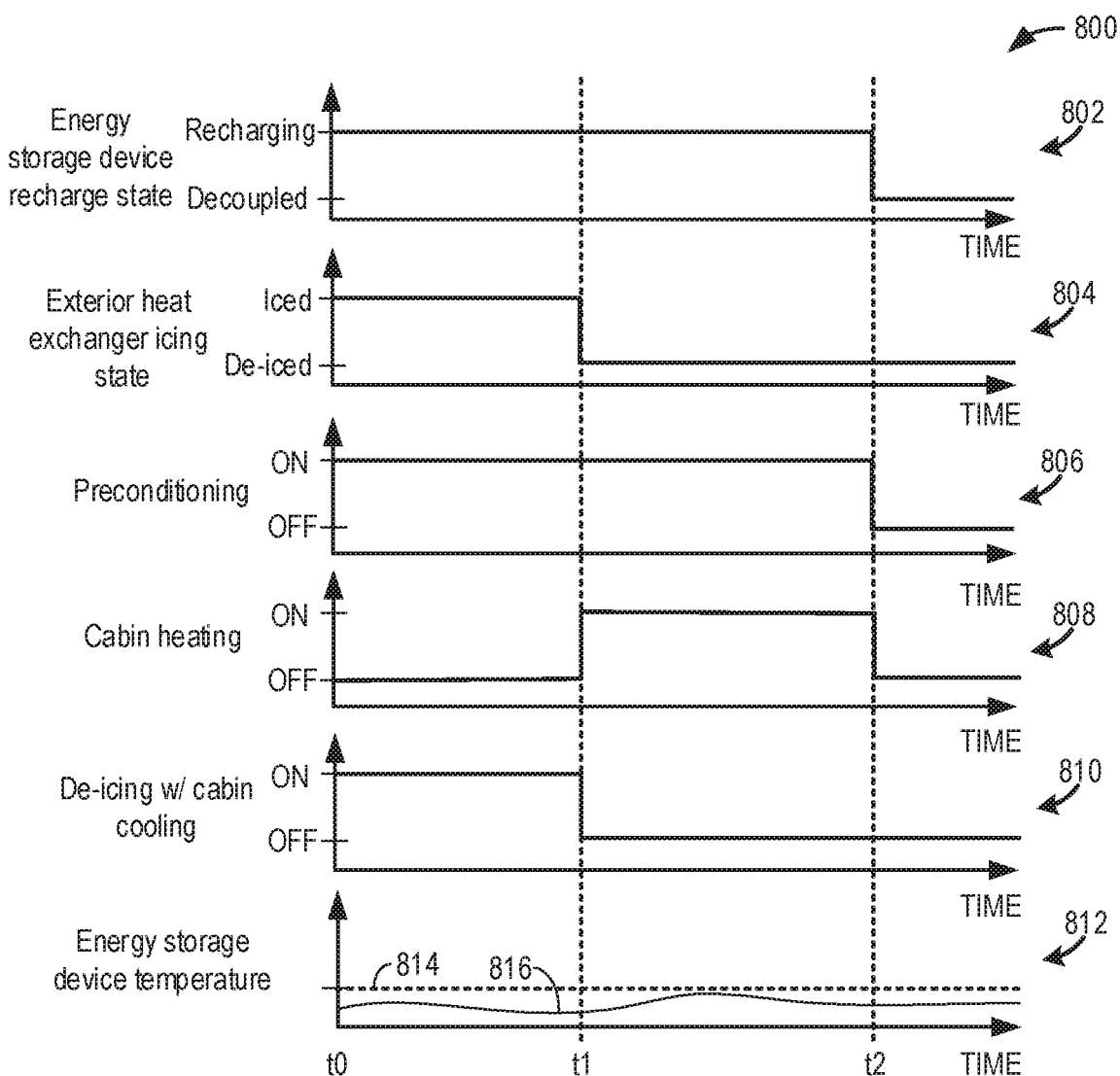

Referring now to FIGS. 7 and 8, simulated sequences for operating a climate control system according to the method of FIGS. 4-6 are shown. In the graphs illustrated in FIGS. 7 and 8 time is indicated on the abscissas. It will be understood that FIGS. 7 and 8 are use-case climate control system operating sequences and numerous suitable operating sequences have been envisioned.

Turning to FIG. 7, energy storage device recharge state is indicated on the ordinate of graph 702 with values "recharging" and "decoupled" indicating the energy storage device is receiving energy from or decoupled from an external energy source. An exterior heat exchanger icing state is indicated on the ordinate of graph 704 with values of "iced" and "de-iced" in FIG. 7. Additionally, a preconditioning operational state is indicated on the ordinate of graph 706 with values of "on" and "off" in FIG. 7. A state of cabin heating mode is indicated on the ordinate of graph 708 with values of "on" and "off" in FIG. 7. A state of the exterior heat exchanger de-icing mode is indicated on the ordinate of graph 710 with values of "on" and "off". Energy storage device temperature is also indicated on the ordinate of graph 712 with plot 714.

At t0 the energy storage device is being recharged, the exterior heat exchanger is iced, a preconditioning event is occurring, and the energy storage device temperature is greater than a threshold value 716. Responsive to these conditions occurring the exterior heat exchanger de-icing and cabin heating modes are turned on. In this way, heat exchanger de-icing and cabin heating can occur at overlapping time intervals for efficient system operation. However, other sets of entry conditions for the first mode of system operation have been envisioned.

Next at t1 the exterior heat exchanger de-icing mode is discontinued responsive to the exterior heat exchanger achieving a de-iced state. At t2 cabin heating is discontinued responsive to the cabin precondition event ending and the energy storage device being decoupled from the external energy source. In this way, in the first mode of operation the exterior heat exchanger may be opportunistically de-iced along with cabin heating during a pre-conditioning event. However, as previously discussed, the first mode of operation may also be carried out during a remote start event where various vehicle systems have been started-up but the vehicle is stationary.

Turning to FIG. 8, energy storage device recharge state is indicated on the ordinate of graph 802 with values "recharging" and "decoupled". An exterior heat exchanger icing state is indicated on the ordinate of graph 804 with values of "iced" and "de-iced" in FIG. 8. Additionally, a preconditioning operational state is indicated on the ordinate of graph 806 with values of "on" and "off" in FIG. 8. A cabin heating operational state is indicated on the ordinate of graph 808 with values of "on" and "off" in FIG. 8. A state of a de-icing mode where cabin cooling is used to enable de-icing operation in indicated on the ordinate of graph 810 with values of "on" and "off". Energy storage device temperature is also indicated on the ordinate of graph 812 with plot 814.

At t0 the energy storage device is being recharged, the exterior heat exchanger is iced, a cabin pre-conditioning event is occurring, and the energy storage device temperature is below a threshold value 816. Responsive to these conditions occurring the de-icing mode is turned on. However, from t0 to t1 cabin heating is turned off. In this way, the second mode of system operation can be initiated when the energy storage device is below the threshold value and during cabin preconditioning. It will be understood, that other sets of entry conditions for the second mode of system operation have been contemplated.

At t1 the exterior heat exchanger is deemed to be de-iced and the exterior heat exchanger de-icing mode is therefore turned off. Additionally, at t1 the cabin heating mode is turned on. In this way, cabin heating can occur subsequent to de-icing of the exterior heat exchanger.

At t2 cabin heating is discontinued responsive to the cabin precondition event ending and the energy storage device being decoupled from the external energy source. In this way, the second mode may be discontinued responsive to cessation of the preconditioning event. It will be understood, that the second mode of system operation may occur during other conditions such as during a remote start event or when the vehicle is not receiving energy from an external energy source.

The technical effect of de-icing the exterior heat exchanger using the first mode of system operation is to increase system efficiency by allowing exterior heat exchanger de-icing and cabin heating to occur during the same time period using excess thermal energy from the heat source. Another potential technical effect of implementing the first mode is a quicker preparation of the conditioned cabin. The technical effect of de-icing the exterior heat exchanger using the second mode of system operation is to allow exterior heat exchanger de-icing to be efficiently performed by cooling the cabin. Another potential technical effect of the second mode is to allow for cabin conditioning to occur before passenger arrival, thereby increasing customer satisfaction.

The invention will be further described in the following paragraphs. In one aspect, a first method for operating a heat pump system is provided that comprises, responsive to determining a presence of exterior heat exchanger icing, selecting a first mode of heat pump system operation based on cabin preconditioning or remote start. In the first mode the heat pump system is operated to heat the exterior heat exchanger and a vehicle cabin using thermal energy from a heat source to de-ice the exterior heat exchanger and climate condition the vehicle cabin. In one example, the method may further comprise, responsive to determining the presence of exterior heat exchanger icing and determining a temperature of the energy storage device is less than a threshold value, selecting a second mode of heat pump system operation, in the second mode the heat pump system receives heat from the vehicle cabin and transfers the heat to the exterior heat exchanger to de-ice the exterior heat exchanger. In another example, the method may further comprise advancing a start time of the cabin preconditioning in response to the selection of the first method. In a third example, where the heat source is an energy storage device and where the method further comprises, responsive to determining a presence of exterior heat exchanger icing and an absence of coupling between the energy storage device and an external energy source, selecting a third mode of heat pump system operation, in the third mode the vehicle cabin is heated through operation of an electric heater.

In another aspect, a vehicle system is provided that comprises: a heat pump system configured to heat and cool a vehicle cabin and including an exterior heat exchanger; an electric heater configured to provide heat to the vehicle cabin; an energy storage device configured to couple to an external energy source and to provide energy to an electric motor coupled to a drive wheel; and a controller including: instructions stored in memory that when executed, during icing of the exterior heat exchanger, cause the controller to: select a first mode of heat pump system operation based on a scheduled cabin preconditioning event or a remote start request, where in the first mode the exterior heat exchanger and a vehicle cabin are heated using thermal energy from the energy storage device to de-ice the exterior heat exchanger and climate condition the vehicle cabin; and instructions stored in the memory that when executed, during icing of the exterior heat exchanger, cause the controller to: select a second mode of heat pump system based on an absence of the scheduled preconditioning event and the remote start request, operation where the heat pump system receives heat from the vehicle cabin and transfers the heat to the exterior heat exchanger to de-ice the exterior heat exchanger.

In yet another aspect, a method for operating a heat pump system is provided that comprises: responsive to determining a presence of icing of an exterior heat exchanger and determining a temperature of an energy storage device is greater than a threshold value, selecting a first mode of heat pump system operation responsive to initiating a scheduled cabin preconditioning or a vehicle remote start, in the first mode the heat pump system is operated to heat the exterior heat exchanger and a vehicle cabin using thermal energy from the energy storage device to de-ice the exterior heat exchanger and climate condition the vehicle cabin; and responsive to determining a presence of icing of the exterior heat exchanger, determining an absence of a scheduled cabin preconditioning or a vehicle remote start, and determining the temperature of the energy storage device is less than the threshold value, selecting a second mode of heat pump system operation, in the second mode the heat pump system receives heat from the vehicle cabin and transfers the heat to the exterior heat exchanger to de-ice the exterior heat exchanger. In a second example, further comprising responsive to determining the presence of icing of the exterior heat exchanger and an absence of coupling between the energy storage device and an external energy source, selecting a third mode of heat pump system operation, in the third mode the vehicle cabin is heated through operation of an electric heater. In a third example, further comprising advancing a start time of the scheduled cabin preconditioning in response to an anticipation of the selection of the first mode.

In any of the aspects or combinations of the aspects, the heat source may be an energy storage device.

In any of the aspects or combinations of the aspects, the first mode may be selected in response to determining the energy storage device is couple to an external power source.

In any of the aspects or combinations of the aspects, the first mode may be selected responsive to determining a temperature of the energy storage device is greater than a threshold value.

In any of the aspects or combinations of the aspects, the first mode may be selected responsive to the energy storage device exceeding the threshold temperature.

In any of the aspects or combinations of the aspects, the second mode may be selected based on an absence of a scheduled preconditioning event and/or a remote start.

In any of the aspects or combinations of the aspects, in the first mode, an energy storage device cooler may operate as a chiller to enable heat transfer to the exterior heat exchanger.

In any of the aspects or combinations of the aspects, the vehicle system may further comprise instructions stored in the memory that when executed, during icing of the exterior heat exchanger and an absence of coupling between the energy storage device and an external energy source, may cause the controller to: select a third mode of heat pump system operation, in the third mode the vehicle cabin is heated through operation of an electric heater.

In any of the aspects or combinations of the aspects, the first mode may be selected responsive to determining a temperature of the energy storage device is greater than a threshold value and where the second mode may be selected responsive to determining the temperature of the energy storage device is less than the threshold value.

In any of the aspects or combinations of the aspects, the vehicle system may further comprise an energy storage device cooler and in the first mode the energy storage device cooler may operate as a chiller to enable heat transfer to the exterior heat exchanger.

In any of the aspects or combinations of the aspects, the first and second modes may be each selected when the energy storage device is coupled to the external energy source.

In any of the aspects or combinations of the aspects, the vehicle system may further comprise instructions stored in the memory that when executed cause the controller to, in response to selecting the first mode, may advance a start time of the scheduled cabin preconditioning event.

In any of the aspects or combinations of the aspects, the first mode and/or second mode may be selected when the energy storage device is coupled to the external energy source.

In another representation, a method for operating a system in a vehicle is provided that comprises, during a first set of operating conditions, implementing a first mode where a heat pump assembly in a vehicle operates to increase a temperature of a vehicle cabin and an exterior heat exchanger in the heat pump assembly; and during a second set of operating conditions, implementing a second mode where an electric heater increases the temperature of the vehicle cabin.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle system, comprising:
responsive to determining a presence of exterior heat exchanger icing, selecting a first mode of vehicle system operation based on cabin preconditioning or remote start, in the first mode a heat pump circuit is operated to heat the exterior heat exchanger and a vehicle cabin using thermal energy from a heat source to de-ice the exterior heat exchanger and climate condition the vehicle cabin;
where the heat source is an energy storage device, and
where the first mode is selected responsive to determining a temperature of the energy storage device is greater than a threshold value.

2. The method of claim 1, where the first mode is selected in response to determining the energy storage device is coupled to an external power source.

3. The method of claim 1, further comprising, responsive to determining the presence of exterior heat exchanger icing and determining a temperature of the energy storage device is less than a threshold value, selecting a second mode of vehicle system operation, in the second mode the heat pump circuit uses heat from the vehicle cabin to transfer heat to the exterior heat exchanger to de-ice the exterior heat exchanger.

4. The method of claim 3, where the second mode is selected based on an absence of a scheduled preconditioning event and/or a remote start request.

5. The method of claim 1, where, in the first mode, an energy storage device cooler operates as a chiller to enable the heat pump circuit to transfer heat to the exterior heat exchanger.

6. The method of claim 1, further comprising advancing a start time of the scheduled start time for cabin preconditioning in response to the selection of the first mode.

7. The method of claim 1, where the heat source is an energy storage device and where the method further comprises, responsive to determining a presence of exterior heat exchanger icing and an absence of coupling between the energy storage device and an external energy source, selecting a third mode of vehicle system operation, in the third mode the exterior heat exchanger is de-iced through operation of an electric heater.

8. A vehicle system comprising:
a heat pump system configured to heat and cool a vehicle cabin and including an exterior heat exchanger;
an electric heater configured to provide heat to the vehicle cabin;
an energy storage device configured to couple to an external energy source and to provide energy to an electric motor coupled to a drive wheel; and a controller including:
  instructions stored in memory that when executed, during icing of the exterior heat exchanger, cause the controller to:
    select a first mode of vehicle system operation based on a scheduled cabin preconditioning event or a remote start request, where in the first mode the exterior heat exchanger and a vehicle cabin are heated by the heat pump system using thermal energy from the energy storage device to de-ice the exterior heat exchanger and climate condition the vehicle cabin; and
  instructions stored in the memory that when executed, during icing of the exterior heat exchanger, cause the controller to:
    select a second mode of vehicle system operation based on an absence of the scheduled preconditioning event and the remote start request, where the heat pump system receives heat from the vehicle cabin and transfers heat to the exterior heat exchanger to de-ice the exterior heat exchanger.

9. The vehicle system of claim 8, further comprising instructions stored in the memory that when executed, during icing of the exterior heat exchanger and an absence of coupling between the energy storage device and an external energy source, cause the controller to:
  select a third mode of vehicle system operation, in the third mode the exterior heat exchanger is de-iced through operation of an electric heater.

10. The vehicle system of claim 8, where the first mode is selected responsive to determining a temperature of the energy storage device is greater than a threshold value and where the second mode is selected responsive to determining the temperature of the energy storage device is less than the threshold value.

11. The vehicle system of claim 8, further comprising an energy storage device cooler and in the first mode the energy storage device cooler operates as a chiller to enable the heat pump system to transfer heat to the exterior heat exchanger.

12. The vehicle system of claim 8, where the first and second modes are each selected when the energy storage device is coupled to the external energy source.

13. The vehicle system of claim 8, further comprising, instructions stored in the memory that when executed cause the controller to, in response to selecting the first mode, advancing a start time of the scheduled start time for a cabin preconditioning event.

14. A method for operating a vehicle climate control system, comprising:
  responsive to determining a presence of icing of an exterior heat exchanger and determining a temperature of an energy storage device is greater than a threshold value, selecting a first mode of climate control system operation responsive to initiating a scheduled cabin preconditioning or a vehicle remote start, in the first mode a heat pump circuit in the climate control system is operated to heat the exterior heat exchanger and a vehicle cabin using thermal energy from the energy storage device to de-ice the exterior heat exchanger and climate condition the vehicle cabin; and
  responsive to determining a presence of icing of the exterior heat exchanger, determining an absence of a scheduled cabin preconditioning or a vehicle remote start, and determining the temperature of the energy storage device is less than the threshold value, selecting a second mode of climate control system operation, in the second mode the heat pump circuit receives heat from the vehicle cabin and transfers heat to the exterior heat exchanger to de-ice the exterior heat exchanger.

15. The method of claim 14, further comprising responsive to determining the presence of icing of the exterior heat exchanger and an absence of coupling between the energy storage device and an external energy source, selecting a third mode of climate control system operation, in the third mode the exterior heat exchanger is de-iced through operation of an electric heater.

16. The method of claim 14, further comprising advancing a start time of the scheduled start time for cabin preconditioning in response to an anticipation of the selection of the first mode.

17. The method of claim 14, where the first mode and/or second mode are selected when the energy storage device is coupled to the external energy source.

* * * * *